United States Patent [19]

Cooper

[11] Patent Number: 4,754,356

[45] Date of Patent: Jun. 28, 1988

[54] DISC DRIVE HEAD CLEANING CASSETTE

[76] Inventor: Albert A. Cooper, 1, Wolsey Road, Hemel Hempstead, Hertfordshire HP2 4TU, England

[21] Appl. No.: 899,936

[22] Filed: Aug. 25, 1986

Related U.S. Application Data

[62] Division of Ser. No. 711,311, Mar. 13, 1985, abandoned.

[30] Foreign Application Priority Data

Nov. 6, 1984 [GB] United Kingdom ................. 8428012
Dec. 3, 1984 [EP] European Pat. Off. ........ 84.308381.7

[51] Int. Cl.⁴ ...................... G11B 5/41; G11B 23/033
[52] U.S. Cl. ..................................... 360/128; 360/133
[58] Field of Search ............................... 360/128, 133

[56] References Cited

U.S. PATENT DOCUMENTS 4,065,798 12/1977 Sugisaki et al. .................... 360/128

Primary Examiner—Robert S. Tupper
Attorney, Agent, or Firm—Kinzer, Plyer, Dorn, McEachran & Jambor

[57] ABSTRACT

Sheet material for cleaning the head of a magnetic storage disc drive, comprising a sheet of head-cleaner material which serves to clean such a head, the head-cleaner material being laminated to a backing sheet of stiffening material. This composite sheet material may be cut to the shape of a magnetic storage disc and contained within a protective cassette housing.

4 Claims, 3 Drawing Sheets

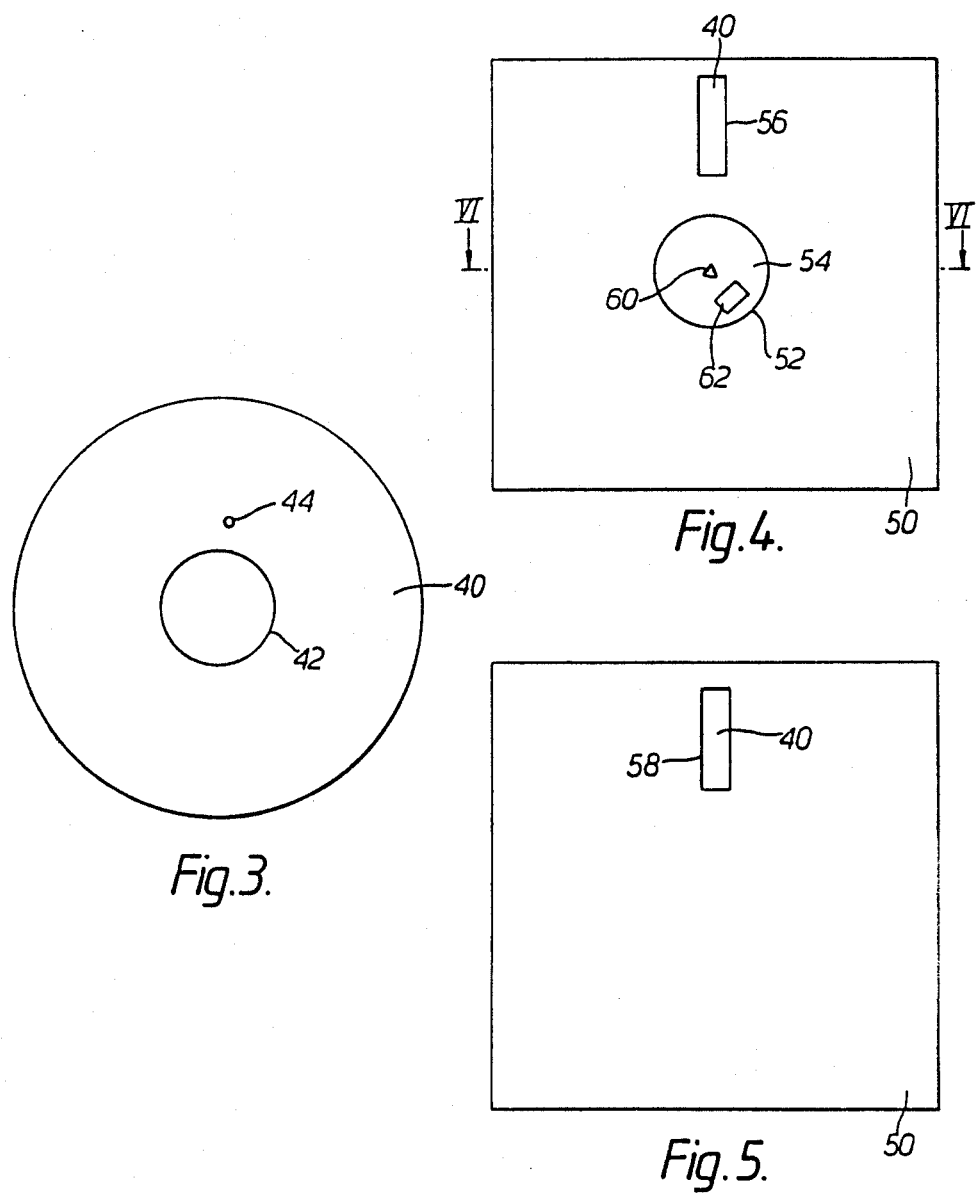

DISC DRIVE HEAD CLEANING CASSETTE

This is a division of application Ser. No. 711,311, filed Mar. 13, 1985, now abandoned.

The present invention relates to disc drive head cleaning means for magnetic storage disc drives such as are used in microcomputers, word processors, and typewriter systems.

To reduce the likelihood of data corruption in the transfer of data between the magnetic read/write head of a disc drive and a magnetic storage disc, it has been found desirable to clean the head frequently. Hitherto, this has been done with a disc of an appropriate sheet of cleaning material enclosed in an envelope so as to have substantially the same construction as an ordinary magnetic storage disc cartridge, such as is described in published United Kingdom Patent Specification No. 2,091,472A. The disc drive does not distinguish between the cleaning disc and the magnetic dis, and therefore brings the read/write head down on to the cleaning material may be impregnated with a solvent or alternatively the cleaning material may be abrasive so that it can clean the head without the use of solvent. One material which has already been proposed is a non-woven polypropylene material called REEMAY (Registered Trade Mark). This has an abrasive action on the computer head and may also be impregnated with a cleaning solvent.

These cleaning devices have proved adequate for microcomputers or microcomputer disc drives which take floppy discs having diameters of about 5¼" or about 8". However, with the new generation of microcomputers which take floppy discs of a diameter about 3.5", or even less, precision and cleanliness become more important, and the prior methods of cleaning the disc drive head which use an impregnated or abrasive sheet material are too crude.

There are materials which are substantially 100% lint free, and which have a fine finish so that they do the cleaning job for the new generation of microcomputers very well. One such material is a spunlaced fabric named SONTARA (Registered Trade Mark) reference No. 8801. This is a polyester blend. The problem arises with such materials that they tend to be too limp to take the place of a floppy disc. This is particularly so in the case of 3.5" discs which are usually encased in a precision made plastics cassette which is designed to position the disc precisely in relation to the disc drive head. To this end the cassette includes a hub and hub locating means which interengage to ensure a precise lateral positioning of the disc. It also has a non-woven lint-free fabric stuck to its internal walls between which the disc is sandwiched to ensure its precise positioning as regards its depth in relation to the cassette, to ensure ease of rotation of the disc with the cassette without risk of the cassette walls scratching the magnetic material of the disc, and also to clean the disc as it rotates. Additional pressure may be provided between the fabric and the disc to clean the latter, by way of a fabric pad between the cassette wall and one of the fabric covers and a resilient plastics leaf spring between the other internal wall of the cassette and its associated fabric cover, the pad and the spring being in registration with one another. The need for such a construction in a 3.5" cassette increases the problems associated with the limpness of cleaning materials suitable for disc drive heads of 3.5" disc drives. The disc of cleaning material simply would not rotate with the hub, so that it would crumple and simply create a mess inside the cassette.

One effort to solve this problem has been made in which a stiffening material in sheet form has been used as a backing for the cleaning material, the two materials being stuck together by means of adhesive. The disadvantages of this are (a) the die stamp which stamps out the disc shapes from the composite sheet material can become clogged with adhesive; (b) adhesive may remain on the disc after stamping and foul the cassette and/or the disc drive head; and (c) the fabric can be torn away from the backing creating a mess inside the cassette which could damage the disc drive head or prevent the disc from rotating in the cassette.

It is an aim of the present invention to overcome these problems, or at least to provide means which are less subject to them.

According to a first aspect of the present invention, there is provided sheet material for cleaning the head of a magnetic storage disc drive, comprising a sheet of head-cleaner material which serves to clean such a head, characterised in that the head-cleaner material is laminated, as defined herein, to a backing sheet of stiffening material.

For a double sided disc drive, the composite sheet material may be double sided, with head-cleaner material laminated to both sides of the backing sheet of stiffening material so that the backing is sandwiched between two sheets of head-cleaner material.

It will be appreciated that "laminating" in this context means bonding together other than by means of an adhesive, such as by fusing with or without the intermediary of a fusing medium. For example, the two layers of material may be bonded together by means of a curtain coating of a molten plastics material such as polythene or polyethylene between the two layers, or they may be bonded directly to one another by means of one or more embossed heated rollers in a hot pinning method. Alternatively, pressure bonding may be used, or a combination of heat and pressure bonding.

According to a second aspect of the present invention there is provided a method of making a sheet material for cleaning the head of a magnetic storage disc drive, characterised in that a sheet of head-cleaner material which serves to clean such a head is laminated, as defined herein, to a backing sheet of stiffening material.

One way of performing the lamination is to apply a molten sheet of plastics material such as polyethylene to the backing sheet and then to press the disc drive head-cleaning material on to that side of the backing sheet to which has been applied the polycurtain coat.

Preferably the disc drive head-cleaning material comprises a blend of polyester and cellulose material SONTARA (Registered Trade Mark) reference No. 8801 (an alternative being REEMAY (Registered Trade Mark) 2024). The backing may comprise a transparent nylon film or, for example, a polyethylene terephthalate polyester MYLAR (Registered Trade Mark) reference No. 812. Another material for use as a backing may be a polyethelene terephthalate material MELINEX (Registered Trade Mark).

The present invention extends to a device for use in cleaning the head of a magnetic storage disc drive, characterised by a flat cassette housing containing an annulus or disc of sheet material in accordance with the said first aspect of the present invention. Preferably, internal surfaces of the cassette housing facing the sheet material are provided with a solid lubricant material.

For example, a TEFLON (Registered Trade Mark) or any other PTFE material) covering may be stuck to the internal walls of the cassette so that the head cleaning disc is sandwiched between and rotates within the TEFLON (Registered Trade Mark) covers. One useful TEFLON (Registered Trade Mark) material is adhesive backed and is called TYGAFLOR (Registered Trade Mark). The TEFLON (Registered Trade Mark) acts as a solid lubricant for the head cleaning disc and also minimises the risk of fabric particles breaking away from the disc and fouling the disc drive head.

Examples of a disc drive head-cleaning laminate made in accordance with the present invention and a cassette incorporating such a laminate are illustrated in the accompanying drawings in which :

FIG. 3 is a plan view of a disc of the laminate suitable for use in a 3.5" disc cassette;

FIG. 4 is a front view of such a cassette;

FIG. 5 is a rear view of the cassette shown in FIG. 4; and

Figure 1:
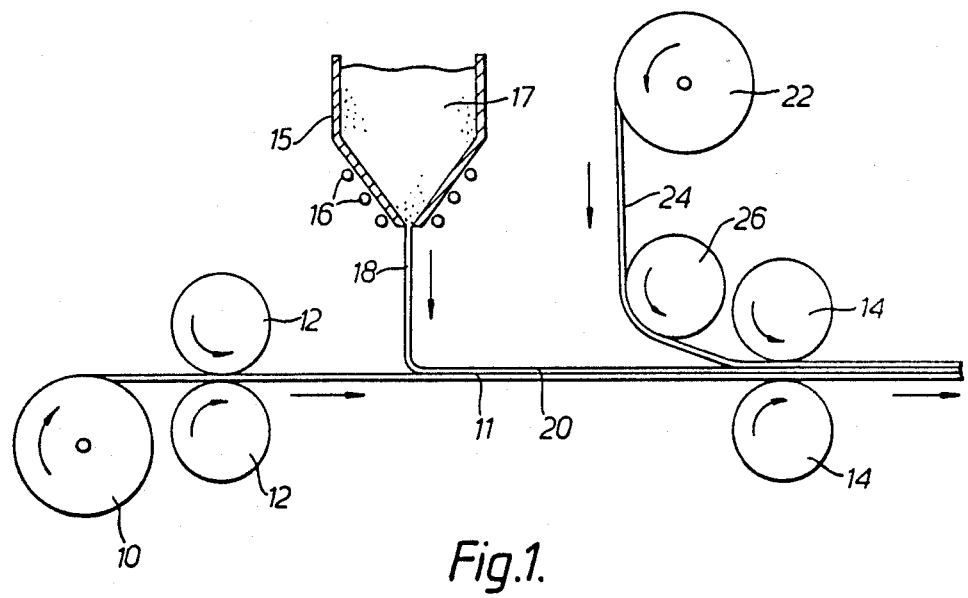
FIG. 1 is a diagrammatic elevational view of apparatus for making the laminate.

With reference to FIG. 1, a roll 10 of transparent polyethylene terephthalate polyester sheet material MYLAR (Registered Trade Mark) reference No. 812, is supported with its axis horizontal. A length 11 from that roll extends through guide rollers 12, which also have their axes horizontal, and through press rollers 14 which also have their axes horizontal and which are spaced horizontally from the guide rollers 12. An elongate hopper 15 (shown diagrammatically in cross-section in FIG. 1) is positioned above the length 11 between the rollers 12 and 14. The hopper is provided with heating elements 16 and contains polyethlene granules 17 which are melted by the heating elements 16. As a result a curtain 18 of the molten polythethylene falls on to the length 11 of MYLAR (Registered Trade Mark) to provide a covering 20 thereon. A roll 22 of spunlaced fbric SONTARA (Registered Trade Mark) 8801 is held with its axis horizontal above the length 11 of MYLAR (Registered Trade Mark) between the rollers 14 and the hopper 15. A length 24 of the SONTARA (Registered Trade Mark) extends downwardly from the roller 22 around a guide roller 26 and thence between the press rollers 14 on to the covering 20. The process is continuous, with the MYLAR (Registered Trade Mark), polyethylene coating, and SONTARA (Registered Trade Mark) being fed continuously in this way between the press rollers 14 at which they become laminated or fused so that the composite material leaving the rollers 14 comprises a layer of MYLAR (Registered Trade Mark) laminated to a layer of SONTARA (Registered Trade Mark) by means of a poplyethylene coating therebetween.

The laminate can be made double-sided, with a layer of MYLAR (Registered Trade Mark) sandwiched between two layers of SONTARA (Registered Trade Mark), either by a second run through the apparatus shown in FIG. 1 using a roll of single-sided laminate in place of the MYLAR (Registered Trade Mark) roll 10 or by having a further hopper 15 and SONTARA (Registered Trade Mark) roll 22 with associated guide 26, and further press rollers 14 positioned further along the production line at a position where the laminate passing from the first set of press rollers 14 has been inverted to allow the exposed side of the MYLAR (Registered Trade Mark) to be covered with molten polyethylene.

Figure 2:
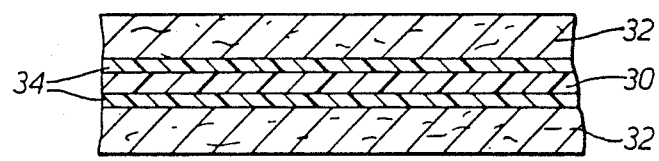
FIG. 2 is a cross-sectional view of the laminate.

A cross-section through the double-sided laminate is shown in FIG. 2. It comprises a sheet 30 of MYLAR (Registered Trade Mark) sandwiched between two sheets 32 of SONTARA (Registered Trade Mark), the MYLAR (Registered Trade Mark) being laminated on both sides to the SONTARA (Registered Trade Mark) by means of polyethylene layers 34. A typical example of the thicknesses of the layers is as follows: SONTARA 7 thou; MYLAR 3 thou; and Polyethylene 2 thou. From this composite sheet material is stamped an annular disc 40, by means of a die stamp, the diameter of the disc being about 3.5", the diameter of the central hole 42 being about 1" and an index hole 44, which is positioned just to one side of the central hole 42, being about 1/10" in diameter.

Figure 6:
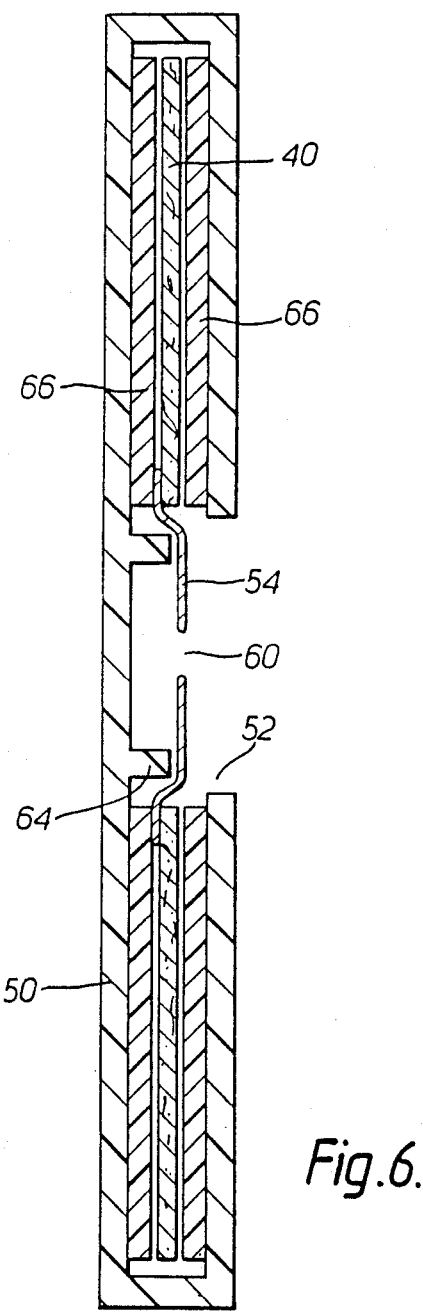
FIG. 6 shows, on a larger scale, a section through the cassette shown in FIG. 4 along the line VI—VI in that Figure.

A rigid or semi-rigid cassette incorporating a disc 40 is shown in FIGS. 4 to 6. It comprises a flat generally square protective housing or casing 50, the thickness of which is greatly exaggerated in FIG. 6 for the sake of clarity. The front wall of the housing 50 has a central hole 52 which exposes a hub 54 within the cassette, and a window 56 wich exposes part of one side of the disc 50, in register with the window 56, exposes a corresponding part of the other side of the disc 40. The hub 54 has a centring hole 60 and a chuck-receiving hole 62. It is seated on a ring 64 within the housing 50 integral with the rear wall thereof. The disc 40 is firmly attached to the rim of the hub 54, for example by means of adhesive. The disc 40 is sandwiched between two TYGAFLOR (Registered Trade Mark) discs 66 respectively stuck to the two main internal faces of the housing 50. Each disc 66 has a slot cut in it so that it does not cover the window 56 or 58.

When the cassette is used, it is inserted in a disc drive (not shown). A centring spindle of the drive engages the centring hole 62 of the hub 54, and a chuck of the drive engages the chuck hole 62. The drive is now operated to bring the drive head or heads into contact with the SONTARA (Registered Trade Mark) of the disc 40 through the windows 56 and 58 in the housing 50, thereby to clean the head or heads as the disc 40 is rotated by the disc drive. Rotation of the disc 40 is greatly eased by the TYGAFLOR (Registered Trade Mark) discs 66.

Numerous modifications and variations to the materials and constructions illustrated in the drawings will occur to the reader without taking it outside the scope of the present invention. The head cleaning material does not have to be a spunlaced polyester. It is peferably non-woven, so that it will not leave particles on the disc drive head, but any material that will perform the head-cleaning function without damaging the head is acceptable. If the housing 50 is made of a suitable nylon material, for example, it may obviate the need for the TYGAFLOR (Registered Trade Mark) or equivalent covers as solid lubricant for the disc 40, although the walls of the housing may have to be brought closer together to take up what would otherwise be voids between the disc and those walls. The cassette may be provided with a protective sliding cover (not shown) which slides over the window 56 and 58, to protect the disc 40 when the cassette is not in use.

I claim:

1. For use in cleaning the head of a magnetic storage disc drive, a device comprising a generally flat container having a central aperture and an off-center aperture and containing an annular laminated magnetic-storage-disc-drive head cleaner which comprises:

(a) an outer circular edge defining the outer periphery of said annulus;

(b) an inner circular edge defining the inner periphery of said annulus;

(c) an annular sheet of magnetic-storage-disc-drive head cleaner material, constituting a first layer of the laminated cleaner;

(d) an annular sheet of stiffening material attached to said annular sheet of cleaning material, to act as a backing therefor, constituting a second layer of the laminated cleaner; and (e) a fused layer between said first layer and said second layer by which said first and second layers are bonded together, part of the sheet material being exposed by the off-center aperture and the sheet material being rotatable within the container, to expose different parts of the material at the off-center aperture, by virtue of the central aperture, in which the stiffening material comprises a film of synthetic plastics material, the cleaner material comprises a non-woven synthetic plastics fabric, and the fused layer is a polycurtain coating consisting of polyethylene.

2. The device of claim 1 in which the container is a cassette, said off-center aperture exposing a portion of one side of the cleaner and said central aperture exposing a hub on which the cleaner is mounted.

3. The device of claim 2 in which two discs, each presenting a solid lubricant, are housed within the cassette on opposite sides of the cleaner, one disc being slotted to uncover said off-center aperture.

4. The device of claim 1 in which the container is a cassette, said central aperture exposing a hub on which the cleaner is mounted, there being a pair of off-center apertures, one on each side wall of the cassette, exposing portions of opposite sides of the cleaner, and a pair of discs presenting solid lubricant inside the cassette, with said cleaner sandwiched between the discs, each disc being slotted to uncover, respectively, one of the off-center apertures.

* * * * *